United States Patent
Sharma et al.

(10) Patent No.: US 12,469,513 B2
(45) Date of Patent: Nov. 11, 2025

(54) SYSTEM AND METHOD FOR REPLICATING BACKGROUND ACOUSTIC PROPERTIES USING NEURAL NETWORKS

(71) Applicant: Microsoft Technology Licensing, LLC, Redmond, WA (US)

(72) Inventors: Dushyant Sharma, Tracy, CA (US); James Wellford Fosburgh, Syracuse, NY (US); Patrick Aubrey Naylor, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 18/075,573

(22) Filed: Dec. 6, 2022

(65) Prior Publication Data

US 2024/0185875 A1 Jun. 6, 2024

(51) Int. Cl.
| | |
|---|---|
| G10L 21/0232 | (2013.01) |
| G10L 21/0208 | (2013.01) |
| G10L 21/0264 | (2013.01) |
| G10L 21/034 | (2013.01) |
| G10L 25/18 | (2013.01) |
| G10L 25/30 | (2013.01) |

(52) U.S. Cl.
CPC ...... *G10L 21/0232* (2013.01); *G10L 21/0264* (2013.01); *G10L 21/034* (2013.01); *G10L 25/18* (2013.01); *G10L 25/30* (2013.01); *G10L 2021/02082* (2013.01)

(58) Field of Classification Search
None
See application file for complete search history.

(56) References Cited

U.S. PATENT DOCUMENTS

2021/0142815 A1* 5/2021 Bryan ............... G10L 21/02
2021/0201931 A1* 7/2021 Wang ............... G10L 21/02

OTHER PUBLICATIONS

Yun et al. "Deep Learning-Based Estimation of Reverberant Environment for Audio Data Augmentation", Sensors, 22, 592, Jan. 13, 2022 (Year: 2022).*
Sharma et al. "Non-Intrusive Estimation of Speech Signal Parameters using a Frame-based Machine Learning Approach", EUSIPCO, 2020 (Year: 2020).*
Steinmetz et al. "Automatic Multitrack Mixing With a Differentiable Mixing Console of Neural Audio Effects", ICASSP 2021 (Year: 2021).*
Chung, et al., "Deep Convolutional Neural Network-Based Inverse Filtering Approach For Speech De-Reverberation", In Repository of arXiv:2010.07895v1, Oct. 15, 2020, 6 Pages.
Ratnarajah, et al., "FAST-RIR: Fast Neural Diffuse Room Impulse Response Generator", In repository of arXiv:2110.04057v1, Oct. 7, 2021, 5 Pages.
Ratnarajah, et al., "IR-GAN: Room Impulse Response Generator For Speech Augmentation", In Repository of arXiv:2010.13219v1, Oct. 25, 2020, 5 Pages.

* cited by examiner

*Primary Examiner* — Nicole A K Schmieder
(74) *Attorney, Agent, or Firm* — Foley IP Law, PLLC

(57) ABSTRACT

A method, computer program product, and computing system for estimating noise spectrum from a target audio signal segment. An acoustic neural embedding is generated from the target audio signal segment. An augmented audio signal segment is generated with background acoustic properties of the target audio signal segment by processing an input audio signal segment with the noise spectrum and the acoustic neural embedding using a neural network.

20 Claims, 10 Drawing Sheets

10

```
┌─────────────────────────────┐
│ estimating noise spectrum from │
│ a target audio signal segment  │
└─────────────────────────────┘
          100 ─┘
              ▼
┌─────────────────────────────┐         ┌──────────────────────────────────┐
│ generating an acoustic neural │ ┄┄┄┄┄  │ extracting the acoustic neural embedding │
│ embedding from the target     │        │ from the target audio signal segment using a │
│ audio signal segment          │        │ Non-Intrusive Speech Assessment (NISA) │
└─────────────────────────────┘         │ system                           │
          102 ─┘                        └──────────────────────────────────┘
                                                     ─ 106
```

- 100: estimating noise spectrum from a target audio signal segment
- 102: generating an acoustic neural embedding from the target audio signal segment
- 104: generating an augmented audio signal segment with background acoustic properties of the target audio signal segment by processing an input audio signal segment with the noise spectrum and the acoustic neural embedding using a neural network
- 106: extracting the acoustic neural embedding from the target audio signal segment using a Non-Intrusive Speech Assessment (NISA) system
- 108: estimating loss associated with processing the target audio signal segment with a speech processing system
- 110: processing the filtered audio signal segment with the noise spectrum and the loss associated with processing the target audio signal segment with the speech processing system
- 112: estimating a neural filter from the input audio signal segment
- 114: estimating a filter mask for the acoustic neural embedding
- 116: generating a multiplied filter in the frequency domain by multiplying the neural filter from the input audio signal segment and the filter mask for the acoustic neural embedding
- 118: generating a filtered audio signal segment by convolving the multiplied filter with the input audio signal segment in one of the time domain and the frequency domain
- 120: estimating a noise gain level using the filtered audio signal segment, the acoustic neural embedding, and the noise spectrum
- 122: generating a noise signal segment by multiplying the noise spectrum by the noise gain level

FIG. 1

SYSTEM AND METHOD FOR REPLICATING BACKGROUND ACOUSTIC PROPERTIES USING NEURAL NETWORKS

BACKGROUND

A speech signal acquired in real world conditions is typically corrupted with background noise and room reverberation. When training data-driven speech processing systems like automated speech recognition systems, a mismatch between training data and real world data may result in reduced speech processing system performance. One approach for dealing with any mismatches is data augmentation. Text-To-Speech (TTS) allows for the generation of large amounts of clean speech data. In addition to this clean speech data, there are also clean speech datasets that have known noise or reverberation applied to them. Data augmentation uses signal processing techniques with collections of noise and room impulse response files with prior knowledge of the acoustic parameters. As such, conventional approaches for data augmentation are unable to account for background acoustic properties or require predefined background acoustic properties that may or may not reflect the background acoustic properties of a particular acoustic environment (i.e., when the acoustic properties of the predefined acoustic environment do not match the acoustic properties of the target acoustic environment).

BRIEF DESCRIPTION OF THE DRAWINGS

FIG. 1 is a flow chart of one implementation of the data augmentation process;

Like reference symbols in the various drawings indicate like elements.

DETAILED DESCRIPTION OF THE PREFERRED EMBODIMENTS

Figure 2:
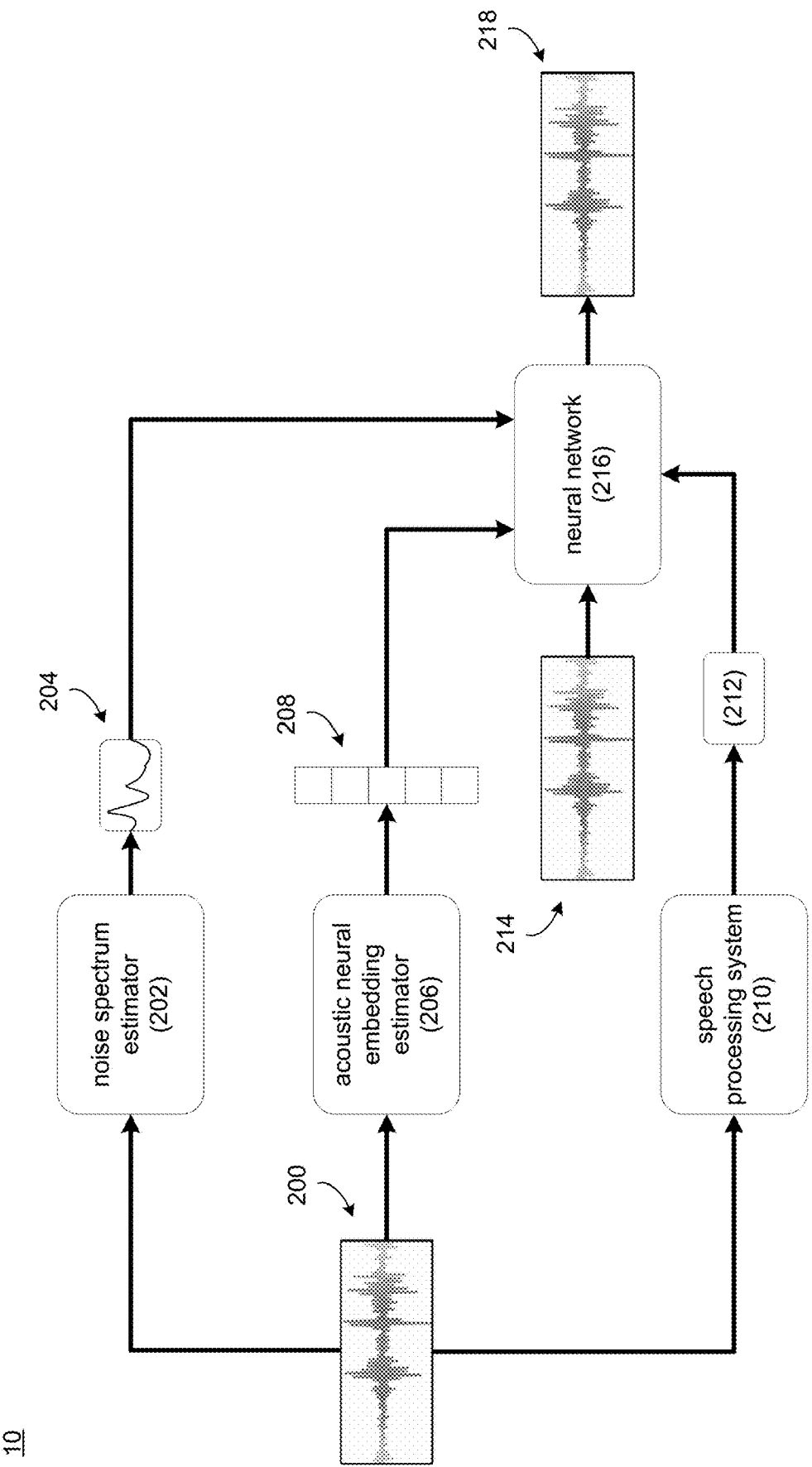
FIG. 2 is a diagrammatic view of one implementation of the data augmentation process.

As will be discussed in greater detail below, implementations of the present disclosure generate a conditioning vector as an input to neural network which allows for the augmentation of an input speech signal to have the background acoustics of a target signal. This approach has the advantage of augmenting an input speech segment based on example field recordings, by using a non-intrusive estimate of the background acoustic properties. Furthermore, neural networks of the present disclosure include neural architectures which allow for noise and reverberation augmentation in both directions (i.e., clean audio signal segments to noisy audio signal segments, or noisy audio signal segments to cleaner audio signal segments).

The details of one or more implementations are set forth in the accompanying drawings and the description below. Other features and advantages will become apparent from the description, the drawings, and the claims.

The Data Augmentation Process:

Referring also to FIGS. 1-10, data augmentation process 10 estimates 100 noise spectrum from a target audio signal segment. An acoustic neural embedding is generated 102 from the target audio signal segment. An augmented audio signal segment is generated 104 with background acoustic properties of the target audio signal segment by processing an input audio signal segment with the noise spectrum and the acoustic neural embedding using a neural network.

As discussed above, current methods for data augmentation rely on simulating various aspects of the signal processing pipeline separately, each of which rely on estimates or prior knowledge of the corrupting process (i.e., known room characteristics, noise type, etc.). Implementations of the present disclosure use a neural network to apply such degradations in an automated manner. Moreover, implementations of the present disclosure perform both degradation and cleaning of an input speech signal based upon the background acoustics determined for a target speech signal. In this manner, the present disclosure allows for data augmentation of input speech signals for training speech processing systems based on an acoustic neural embedding/conditioning vector and allows speech data from TTS-based systems to be used for generating training data.

In some implementations, data augmentation process 10 estimates 100 a noise spectrum from a target audio signal segment. A target audio signal segment is a portion of an audio signal that is used as the basis for data augmentation of an input audio signal segment. For example, suppose a target audio signal is recorded in a particular acoustic environment. In this example, the target audio signal includes particular background acoustic properties that influence speech properties. Background acoustic properties are non-speech acoustic properties (i.e., background relative to a speech signal). Examples of background acoustic properties include reverberation properties (e.g., reverberation time (i.e., $T_{60}$—the time it takes for the sound pressure level to reduce by 60 dB, measured after a generated test signal is abruptly ended)) and noise properties (e.g., noise spectrum, amplitude, frequency, signal-to-noise ratio, etc.). In some implementations, as each acoustic environment (as defined by the location and orientation of audio signal capturing device(s) within an environment that impacts the audio signals captured) is distinct, data augmentation process 10 estimates the acoustic properties of the target audio signal (on a segment-by-segment basis) in order to augment or modify input audio signals to include similar acoustic properties. In this manner, a speech processing system deployed in the target acoustic environment trained with training data including matching acoustic properties in the testing and training will experience better performance than a speech processing system trained without matching acoustic properties. In other words, a speech processing system will perform best when trained with data that is acoustically in the domain of or similar to the "real" data (i.e., the data processed at run-time).

In some implementations, estimating 100 the noise spectrum from the target audio signal segment includes modeling the noise spectrum from the target audio signal segment. For example, a noise spectrum is a representation of the noise within an audio signal segment as a function of time and/or frequency. The noise spectrum is stationary, time-varying, or a recording of a noise signal. In some implementations, data augmentation process 10 estimates 100 the noise spectrum from the target audio signal segment by using a signal processing algorithm to estimate and track the noise spectrum or by using a neural network to estimate the noise spectrum. In one example, estimating 100 the noise spectrum includes averaging past spectral power values, using a time-varying frequency-dependent smoothing parameter that is adjusted by the signal presence probability, where the speech presence probability is controlled by the minima values of a smoothed periodogram. In another example, data augmentation process 10 estimates 100 the noise spectrum by measuring and removing sinusoidal peaks from each frame of a short-time Fourier transform (sequence of FFTs over time). The remaining signal energy is defined as noise.

Referring also to FIG. 2, data augmentation process 10 receives or accesses a target audio signal segment (e.g., target audio signal segment 200) where target audio signal segment 200 is a segment or portion of a target audio signal. In some implementations, the target audio signal is segmented into a plurality of sequential segments with variable or defined lengths or durations in time or particular frequency bins, or combinations of time and frequency. As discussed above and in some implementations, data augmentation process 10 estimates 100 the noise spectrum from target audio signal segment 200. For example, noise spectrum estimator 202 represents a software and/or hardware module with an algorithm or combination of algorithms that estimate 100 the noise spectrum (e.g., noise spectrum 204) for target audio signal segment 200. In one example, noise spectrum estimator 202 is a neural network configured to process an input audio signal segment and output a noise spectrum associated with the input audio signal segment.

In some implementations, data augmentation process 10 generates 102 an acoustic neural embedding from the target audio signal segment. An acoustic neural embedding is a vector or other data structure that represents various background acoustics measured over one or more short time frames. The acoustic neural embedding is generated by isolating the speech content from target audio signal segment and representing the remaining signal as a vector or other data structure. In some implementations, the acoustic neural embedding is estimated using a neural network or other machine learning model. In one example, a Non-Intrusive Speech Assessment (NISA) system is used to extract acoustic embedding from the target audio signal segment. For example, data augmentation process 10 uses a NISA system to extract an acoustic embedding with entries or properties such as reverberation time (i.e., the time in seconds required for the level of the sound to drop 60 dB after the sound source is turned off); C50 (i.e., speech clarity measured as the ratio of the early sound energy (between 0 and 50 milliseconds) and the late sound energy (that arrives later than 50 milliseconds)); signal-to-noise ratio (SNR); a bit rate; gain (i.e., sound strength); etc. measured over short time frames or segments. In some implementations and as discussed above, the length or duration of each frame or segment is predefined and/or user-defined.

Referring again to FIG. 2 and in some implementations, data augmentation process 10 generates 102 an acoustic neural embedding from the target audio signal segment (e.g., target audio signal segment 200). For example, acoustic neural embedding estimator 206 represents any algorithm or combination of algorithms that estimate 106 the acoustic neural embedding (e.g., acoustic neural embedding 208) from target audio signal segment 200. In one example and as discussed above, acoustic neural embedding estimator 206 is a NISA system that generates acoustic neural embedding 208. As will be discussed in greater detail below, acoustic neural embedding 208 acts as a conditioning vector on an input audio signal segment that "conditions" the background acoustic properties of the input audio signal to match those of the target audio signal.

In some implementations, data augmentation process 10 generates 104 an augmented audio signal segment with background acoustic properties of the target audio signal segment by processing an input audio signal segment with the noise spectrum and the acoustic neural embedding using a neural network. As discussed above, implementations of the present disclosure allow for input audio signals to be augmented to include the background acoustic properties of a target audio signal. In contrast with conventional approaches that use predefined room impulse responses or noise signals for known acoustic environments, the acoustic neural embedding generated by data augmentation process 10 allows for the augmentation of an input audio signal to match the background acoustic properties defined by the acoustic neural embedding. In this manner, data augmentation process 10 allows for more closely matched data augmentation of input audio signals without requiring predefined room impulse responses and without knowing the acoustic environment.

In some implementations, the input audio signal is any audio signal received, selected, and/or generated for augmenting with the background acoustic properties of the target audio signal. In one example, the input audio signal is generated using a text-to-speech (TTS) system. In this example, the input audio signal is clean (i.e., does not include any background acoustic properties). As such, conventional data augmentation approaches may be unable to add the background acoustic properties to match those background acoustic properties of the target audio signal. In another example, the input audio signal is a previously recorded audio signal with some background acoustic properties that may or may not match the background acoustic properties of the target audio signal. In this example, conventional data augmentation approaches may be unable to modify the background acoustic properties to match the background acoustic properties of the target audio signal. For example, conventional data augmentation approaches may be unable to perform de-noising or de-reverberation to reduce the background acoustic properties of the input audio signal to match the background acoustic properties of the target audio signal.

In some implementations, the target audio signal segment includes a speech segment. For example, suppose that the target audio signal is a recording of a conversation between a medical professional and a patient. In this example, the target audio signal includes speech portions or segments associated with the medical professional and segments associated with the patient. Regardless of the speaker, each segment may include background acoustic properties associated with the acoustic environment. In some implementations, the target audio signal is processed by a speech processing system. However and as will be discussed in greater detail below, processing the target audio signal introduces certain losses or degradations to the target audio signal.

In some implementations, data augmentation process 10 estimates 108 loss associated with processing the target speech signal segment with a speech processing system. For example, when processing a target speech signal using a speech processing system, certain losses or errors may be estimated in the output of the speech processing system. In one example, the speech processing system is an automated speech recognition (ASR) system configured to recognize speech from an input speech signal. During processing, various errors or losses may be identified in the output of the ASR (e.g., a Word Error Rate (WER)). As will be discussed in greater detail, data augmentation process 10 adds noise and/or reverberation to the input speech signal segment in a way that produces the same amount of error or loss in the speech processing system output as the target speech signal segment. Accordingly, data augmentation process 10 estimates 108 the loss or error associated with the processing of the target speech signal segment. In the example of ASR, data augmentation process 10 estimates 108 the WER and/or Character Error Rate (CER) to modify the input audio signal segment such that the speech processing system generates an output for the augmented audio signal segment that has the same WER and/or CER as the output of the target audio signal segment.

Referring again to FIG. 2, data augmentation process 10 estimates 108 the loss associated with a speech processing system (e.g., speech processing system 210) as a value or function of target speech signal 200 (e.g., estimated loss 212). As will be discussed in greater detail below, data augmentation process 10 provides estimated loss 212 to a neural network for generating an output audio signal.

In some implementations, generating 104 the augmented audio signal segment with background acoustic properties of the target audio signal segment by processing the filtered audio signal segment with the noise spectrum includes processing 110 the filtered audio signal segment with the noise spectrum and the loss associated with processing the target audio signal segment with the speech processing system. For example, suppose that data augmentation process 10 receives an input audio signal with a plurality of input audio signal segments (e.g., input audio signal segment 214) for augmenting with the background acoustic properties of a target audio signal. In this example and as will be discussed in greater detail below; data augmentation process 10 uses a neural network (e.g., neural network 216) with noise spectrum 204, acoustic neural embedding 208, and/or estimated loss 212 to generate an augmented audio signal segment (e.g., augmented audio signal segment 218) with a similar output performance when processed by the speech processing system as the target audio signal segment.

In some implementations, processing the input audio signal segment with the noise spectrum and the acoustic neural embedding using the neural network includes estimating 112 a neural filter from the input audio signal segment. A neural filter is a filter that represents the impact of various signal properties on the input audio signal segment. For example, as reverberation impacts the signal by introducing reflections that build up and decay as sound is absorbed by objects in an acoustic environment. Data augmentation process 10 models this impact as a filter that modifies a signal to include the reflections in the acoustic environment. In one example, the neural filter is a reverberation filter representative of the reverberation in the input audio signal segment. In some implementations, data augmentation process 10 uses a neural filter estimator to estimate 112 the neural filter from the input audio signal segment. A neural filter estimator is a neural network or machine learning model configured to extract or derive a filter representative of the reverberation in the input audio signal segment. For example, the neural filter estimator may iterate through various filtering properties until a filter is found that models the signal properties of the input audio signal segment. In some implementations, estimating 112 the neural filter includes generating a stacked window architecture within a neural network including one window by thirteen time frames by 256 frequency bin windows. In this particular example, data augmentation process 10 is able to isolate reverberation properties from the input audio signal segment. As will be discussed in greater detail below, data augmentation process 10 uses the neural filter in combination with a filter mask from the acoustic embedding to generate a filter that when applied to the input audio signal segment, outputs a transformation of the input audio signal segment with the signal properties of the target audio signal segment. In this manner, data augmentation process 10 is able to map an input audio signal segment to a target audio signal segment.

Figure 3:
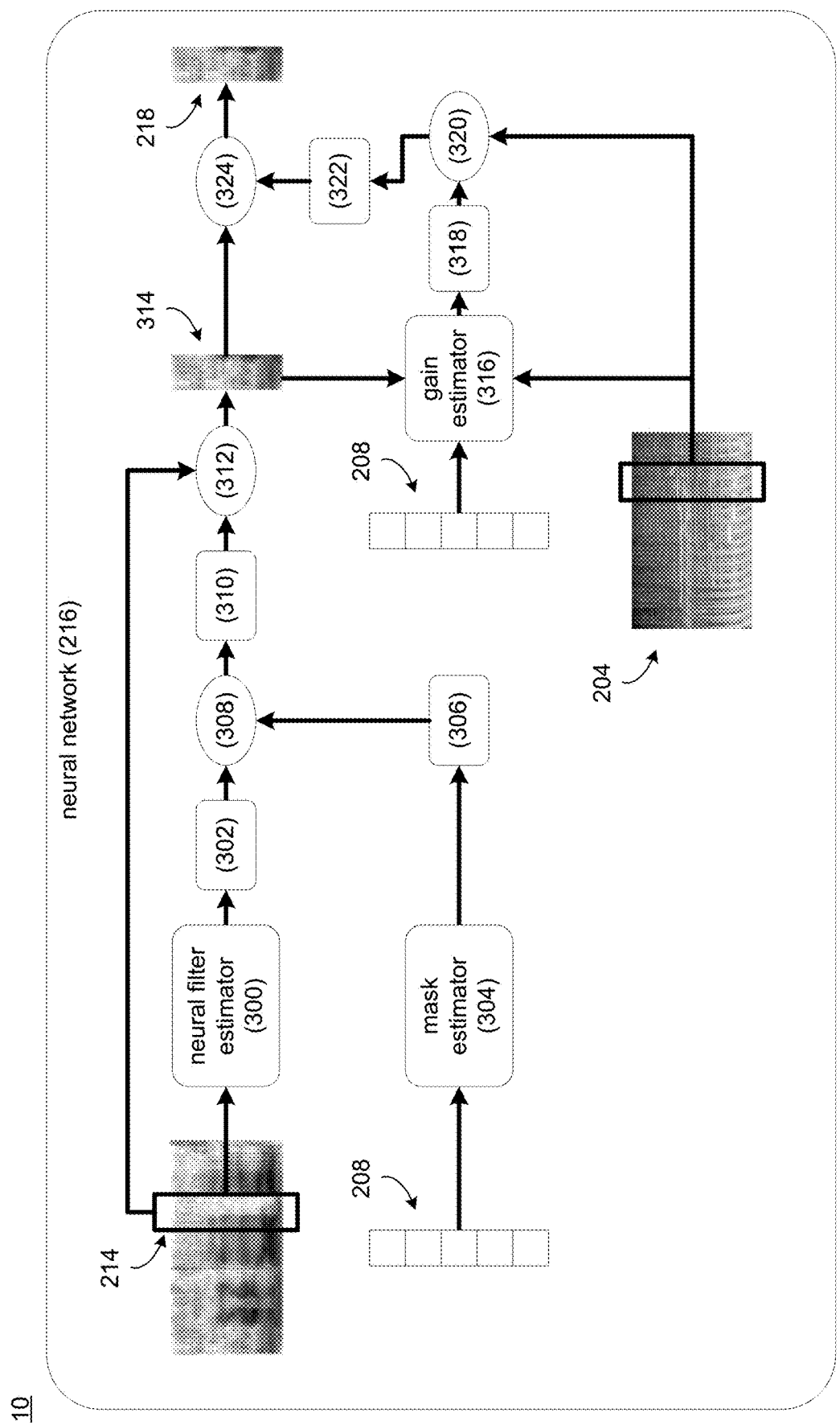
FIG. 3 is a diagrammatic view of a neural network in accordance with one implementation of the data augmentation process.

Referring also to FIG. 3 and in some implementations, suppose data augmentation process 10 receives an input audio signal segment (e.g., input audio signal segment 214) for processing (e.g., data augmentation). In this example, data augmentation process 10 uses neural network 216 to process input audio signal segment 214 in order to generate an augmented audio signal segment with the background acoustic properties of the target audio signal segment (e.g., target audio signal segment 200 shown in FIG. 2). In some implementations, data augmentation process 10 uses a neural filter estimator (e.g., neural filter estimator 300) to estimate 112 a neural filter (e.g., neural filter 302) representative of the reverberation of input audio signal segment 214).

In some implementations, processing the input audio signal segment with the noise spectrum and the acoustic neural embedding using the neural network includes estimating 114 a filter mask for the acoustic neural embedding. A filter mask is a modified version of the acoustic neural embedding reshaped to the dimensions of the neural filter. For example and as discussed above, an acoustic neural embedding includes a vector of various values or functions representative of background acoustic properties of the target audio signal segment. However, the neural filter is a window with a number of frames by a number of frequency bin windows. In one example, the neural filter is a window with thirteen frames by 256 frequency bin windows. In some implementations, data augmentation process 10 estimates the filter mask by using a mask filter estimator. A mask filter estimator is a neural network or machine learning model that takes the acoustic neural embedding as an input and expands the acoustic neural embedding using a number of fully connected layers to reshape the acoustic neural embedding to the dimensions of the neural filter.

Referring again to FIG. 3 and in some implementations, suppose that data augmentation process 10 generates acoustic neural embedding 208 as discussed above. In this example, data augmentation process 10 uses a filter mask estimator (e.g., filter mask estimator 304) to estimate 114 a filter mask (e.g., filter mask 306) from acoustic neural embedding 208.

In some implementations, processing the input audio signal segment with the noise spectrum and the acoustic neural embedding using the neural network includes generating 116 a multiplied filter in the frequency domain by multiplying the neural filter from the input audio signal segment and the filter mask for the acoustic neural embedding. For example, suppose that the neural filter and the filter mask are in the format of a window with a number of frames by a number of frequency bin windows. In this example, by multiplying the neural filter and the filter mask, data augmentation process 10 generates a multiplied filter in the frequency domain that promotes the reverberation of the acoustic neural embedding while nullifying or reducing the reverberation of the input audio signal segment captured by the neural filter. In this manner, the multiplied filter can be applied to the input audio signal segment to generate a representation of the input audio signal segment that includes the reverberation defined by the acoustic neural embedding but without the reverberation only found in the input audio signal segment. Referring again to FIG. 3, data augmentation process 10 multiplies neural filter 302 with filter mask 308 (e.g., represented by action 308) to generate 116 a multiplied filter (e.g., multiplied filter 310).

In some implementations, processing the input audio signal segment with the noise spectrum and the acoustic neural embedding using the neural network includes generating 118 a filtered audio signal segment by convolving the multiplied filter with the input audio signal segment in one of the time domain and the frequency domain. As discussed above, data augmentation process 10 generates 116 a multiplied filter to represent the reverberation present in the target audio signal segment without any extra reverberation present in the input audio signal segment. Accordingly, the resulting multiplied filter is able to add reverberation when the input audio signal segment does not include reverberation present in the target audio signal segment and/or is able to remove or reduce reverberation when the input audio signal segment includes reverberation not present in the target audio signal segment. Referring again to FIG. 3 and in some implementations, data augmentation process 10 convolves (e.g., represented by action 312) input audio signal segment 300 with multiplied filter 310 to generate 118 a filtered audio signal segment (e.g., filtered audio signal segment 314) in one of the time domain and the frequency domain. For example, the multiplied filter (e.g., multiplied filter 310) may be convolved in the time or frequency domain. In some implementations, convolution in the time domain or frequency domain is possible by approximating a convolution in the time domain with a number of shorter convolutions in the frequency domain). In some implementations, filtered audio signal segment 314 is a filtered speech signal that includes reverberation but not noise component or properties. For example, when generating filtered audio signal segment 314, data augmentation process 10 removes or modifies the original noise properties of input audio signal segment 214. As will be discussed in greater detail below and in some implementations, data augmentation process 10 uses the noise spectrum to generate noise-based background acoustic properties for input audio signal segment 214.

In some implementations, processing the input audio signal segment with the noise spectrum and the acoustic neural embedding using the neural network includes estimating 120 a noise gain level using the filtered audio signal segment, the acoustic neural embedding, and the noise spectrum. A noise gain level is a representation of the gain factor to apply to the noise spectrum before it is added to the input audio signal segment for data augmentation. In some implementations, data augmentation process 10 uses the noise gain level to adjust the gain of the noise spectrum for augmenting the input audio signal segment to include similar background noise properties as the target audio signal segment. In some implementations, data augmentation process 10 uses the noise gain level to adjust the gain of the noise spectrum to one or a number of controlled levels. For example, the controlled levels may be user-defined or default levels. By adjusting the gain of the noise spectrum to particular levels that are similar to or different from the noise properties of the target audio signal segment, data augmentation process 10 allows for more diversity in the noise level adjustment which generalizes the model (e.g., neural network 216).

In some implementations, data augmentation process 10 estimates the noise gain level using a gain estimator. A gain estimator is a neural network or machine learning model configured to use speech frames or portions from the filtered audio signal segment, noise frames or portions from the noise spectrum, and the signal-to-noise ratio (SNR) from the acoustic neural embedding to generate the gain level or gain factor for augmenting background noise properties of the input audio signal segment. In some implementations, the gain estimator condenses the speech frame and the noise frame to a single speech value and a noise value, respectively, using fully connected layers. With the single values, the gain estimator concatenates the SNR to the single speech value and the single noise value to generate a new vector. The resulting vector is passed through another fully connected layer to estimate 120 the noise gain level. Referring again to FIG. 3, data augmentation process 10 uses a gain estimator (e.g., gain estimator 316) with filtered audio signal segment 314, acoustic neural embedding 208, and noise spectrum 204 as inputs to estimate 120 a noise gain level (e.g., noise gain level 318).

In some implementations, processing the input audio signal segment with the noise spectrum and the acoustic neural embedding using the neural network includes generating 122 a noise signal segment by multiplying the noise spectrum by the noise gain level. For example, with the gain level estimated 120 from the filtered audio signal segment, the noise spectrum, and the acoustic neural embedding, data augmentation process 10 generates 122 a noise signal segment for applying to the filtered audio signal segment. In this manner, data augmentation process 10 modifies the filtered audio signal segment, which already includes the background reverberation properties of the target audio signal segment, to include the background noise properties of the target audio signal segment. Referring again to FIG. 3 and in some implementations, data augmentation process 10 multiplies the noise spectrum segment (e.g., noise spectrum 204) with gain level 318 (e.g., represented by action 320) to generate 122 a noise signal segment (e.g., noise signal segment 322).

In some implementations, processing the input audio signal segment with the noise spectrum and the acoustic neural embedding using the neural network includes generating 104 the augmented audio signal segment by applying the noise signal segment to the filtered audio signal segment. For example, by combining the noise signal segment with the filtered audio signal segment, data augmentation process 10 generates an augmented audio signal segment that includes the background acoustic properties of the target audio signal segment. Referring again to FIG. 3, data augmentation process 10 adds noise signal segment to filtered audio signal segment (e.g., represented by action 324) to generate 104 augmented audio signal segment 326. In some implementations, augmented audio signal segment 326 is combined with other output audio signal segments to generate an output audio signal including the background acoustic properties of the target audio signal.

Figure 4:
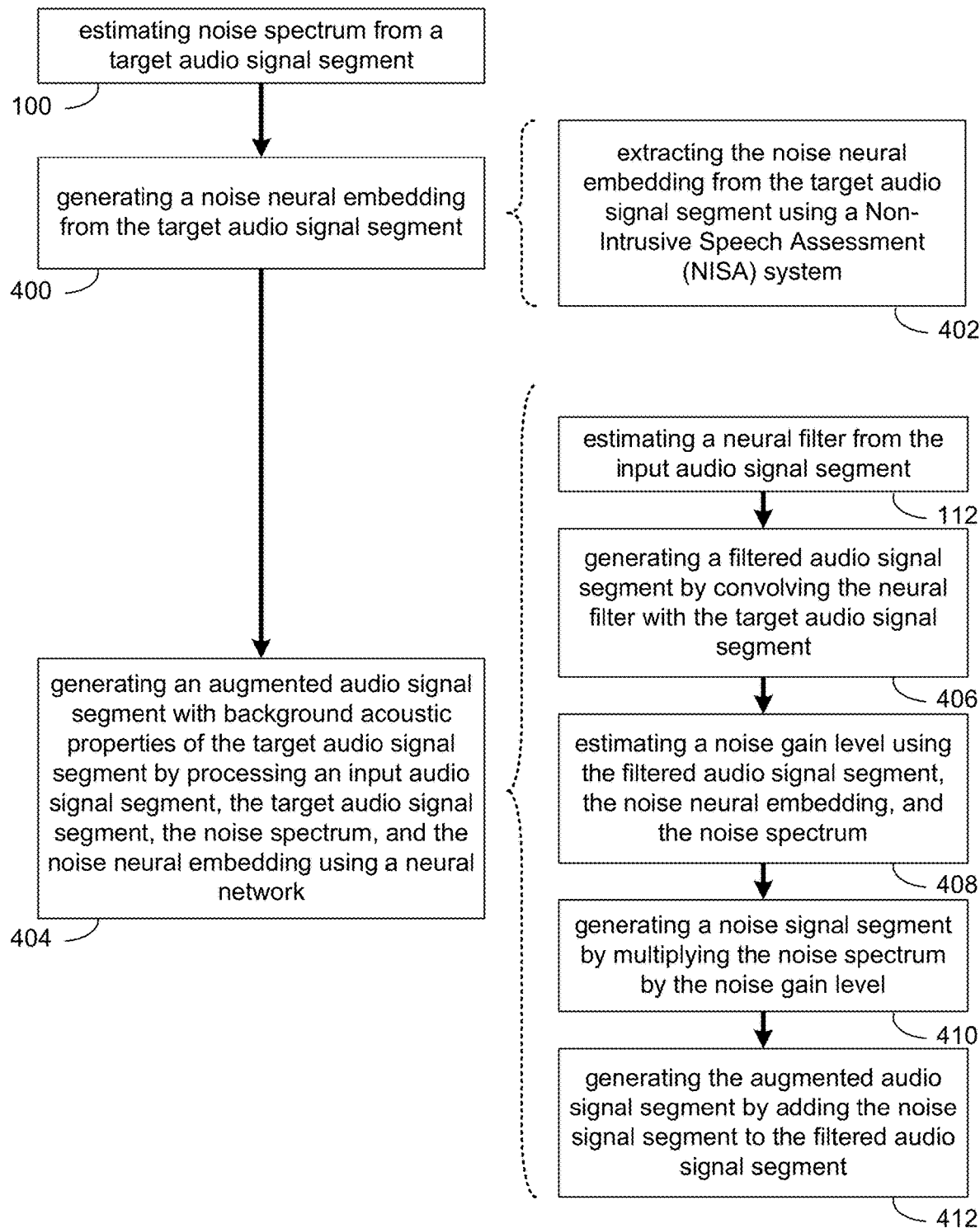
FIG. 4 is a flow chart of one implementation of the data augmentation process.
Figure 5:
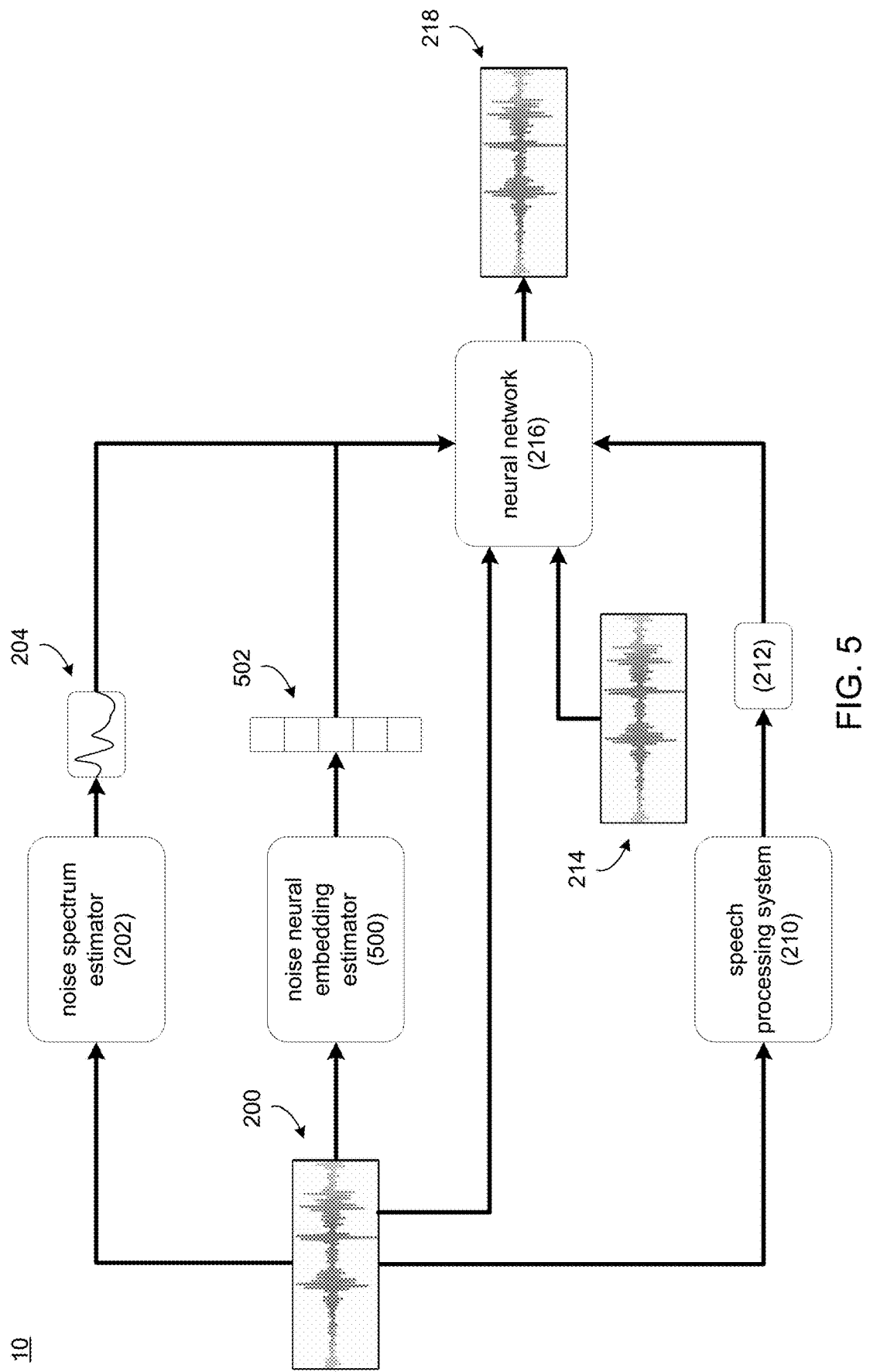
FIG. 5 is a diagrammatic view of one implementation of the data augmentation process.
Figure 6:
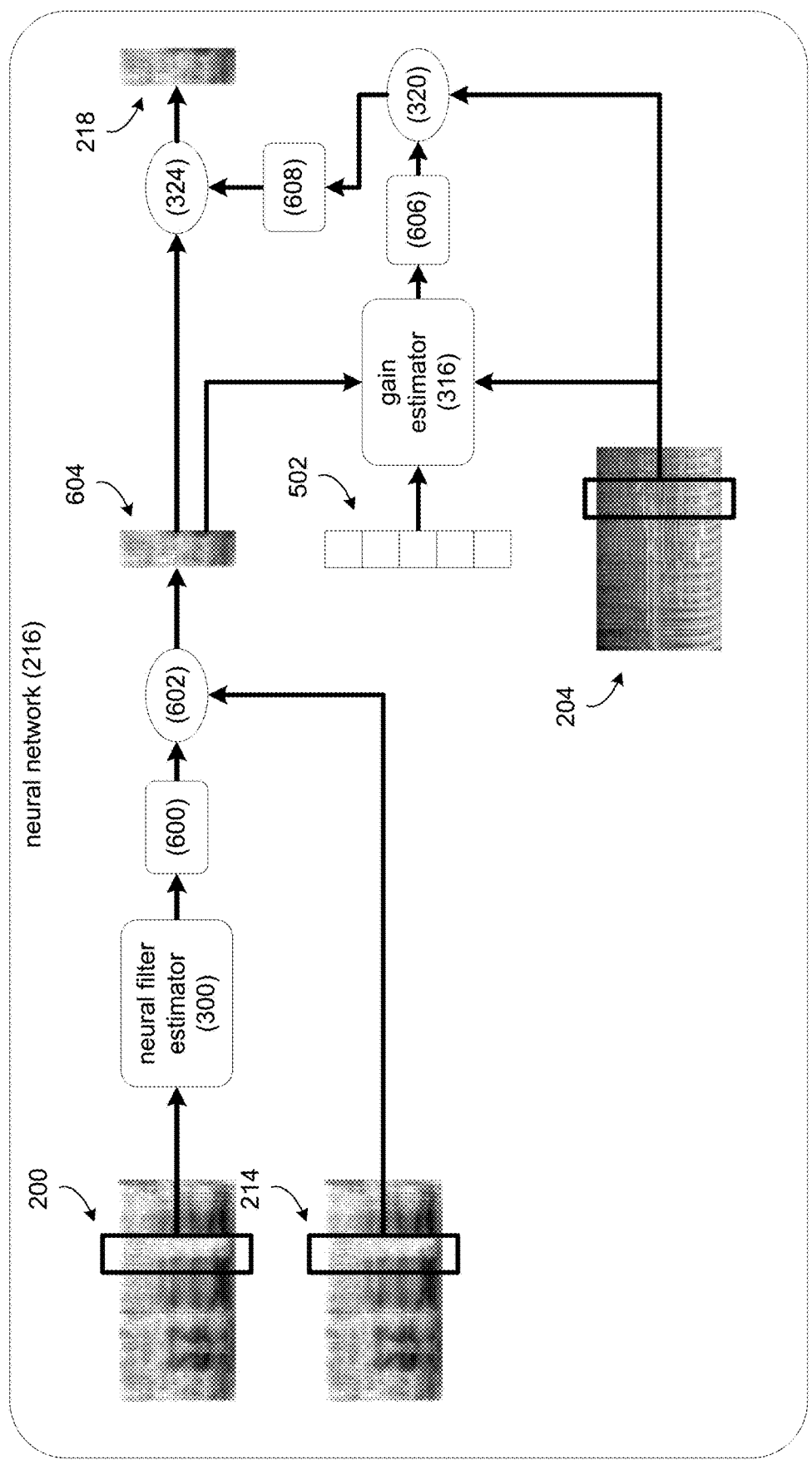
FIG. 6 is a diagrammatic view of a neural network in accordance with one implementation of the data augmentation process.

Referring also to FIGS. 4-6 and in some implementations, data augmentation process 10 generates an augmented audio signal segment with background acoustic properties without generating an acoustic neural embedding. As will be discussed in greater detail below and in some implementations, data augmentation process 10 generates output audio signal segments using only a noise neural embedding. In some implementations, this configuration is useful when the input audio signal segment is derived from clean speech or TTS generated speech. In this example and as will be discussed in greater detail below, the input to neural network is the target audio signal (from which the room impulse response is estimated and applied) and the input audio signal (to which the estimated room impulse response is applied and noise added). In this configuration, the neural embedding is related to noise as opposed to noise and reverberation.

In some implementations, data augmentation process 10 estimates 100 a noise spectrum from a target audio signal segment. Referring also to FIG. 5, data augmentation process 10 uses a noise spectrum estimator (e.g., noise spectrum estimator 202) to estimate 100 a noise spectrum (e.g., noise spectrum 204). In some implementations, data augmentation process 10 provides noise spectrum 204 to a neural network (e.g., neural network 216) for generating an augmented audio signal segment (e.g., augmented audio signal segment 218).

In some implementations, data augmentation process 10 generates 400 a noise neural embedding from the target audio signal segment. A noise neural embedding is a vector or other data structure that represents various noise-related background acoustics measured over one or more short time frames. In some implementations, the noise neural embedding is estimated using a neural network or other machine learning model. In some implementations, a noise neural embedding is extracted that represents noise-related background acoustics for a particular frame or segment of the target audio signal segment. In one example, a Non-Intrusive Speech Assessment (NISA) system is used to extract the noise neural embedding from the target audio signal segment.

For example and instead of, or in addition to, extracting particular noise parameters from the target audio signal segment, data augmentation process 10 uses a NISA system to extract 402 a noise neural embedding with entries or properties such as signal-to-noise ratio (SNR); a bit rate; gain (i.e., sound strength); etc. measured over short time frames or segments. In some implementations and as discussed above, the length or duration of each frame or segment is predefined and/or user-defined.

Referring again to FIG. 2 and in some implementations, data augmentation process 10 generates 404 an acoustic neural embedding from the target audio signal segment (e.g., target audio signal segment 200). For example, noise neural embedding estimator 500 represents any algorithm or combination of algorithms that estimate 400 the noise neural embedding (e.g., noise neural embedding 502) from target audio signal segment 200. In one example and as discussed above, noise neural embedding estimator 500 is a NISA system that generates noise neural embedding 502. As will be discussed in greater detail below, noise neural embedding 208 acts as a conditioning vector on an input audio signal segment that "conditions" the noise-related background acoustic properties of the input audio signal to match those of the target audio signal.

In some implementations, data augmentation process 10 generates 404 an augmented audio signal segment with background acoustic properties of the target audio signal segment by processing an input audio signal segment, the target audio signal segment, the noise spectrum, and the noise neural embedding using a neural network. As discussed above with an acoustic neural embedding, data augmentation process 10 generates an augmented audio signal segment with background acoustic properties of the target audio signal segment by processing input audio signal segment 214, target audio signal segment 200, noise spectrum 204, and noise neural embedding 502 using neural network 216.

In some implementations, processing the input audio signal segment, the target audio signal segment, the noise spectrum, and the noise neural embedding using the neural network includes estimating 112 a neural filter from the input audio signal segment. As discussed above, a neural filter is a filter that represents the impact of various signal properties on the signal segment. In this example, however, data augmentation process 10 estimates 112 a neural filter from the target audio signal segment as opposed to the input audio signal segment as shown in FIG. 3. Referring also to FIG. 6, data augmentation process 10 uses a neural filter estimator (e.g., neural filter estimator 300) to estimate 112 a neural filter (e.g., neural filter 600) representative of the reverberation of target audio signal segment 200).

In some implementations, processing the input audio signal segment, the target audio signal segment, the noise spectrum, and the noise neural embedding using the neural network includes generating 406 a filtered audio signal segment by convolving the neural filter with the input audio signal segment. Referring again to FIG. 6 and in some implementations, data augmentation process 10 convolves (e.g., represented by action 602) neural filter 600 with input audio signal segment 214 to generate 406 a filtered audio signal segment (e.g., filtered audio signal segment 604). In some implementations, filtered audio signal segment 604 is a filtered speech signal that includes reverberation but not noise components or properties of target audio signal segment 200. As will be discussed in greater detail below and in some implementations, data augmentation process 10 uses the noise spectrum to generate noise-based background acoustic properties for target audio signal segment 200.

In some implementations, data augmentation process 10 estimates 408 a noise gain level using the filtered audio signal segment, the noise neural embedding, and the noise spectrum. As discussed above, data augmentation process 10 uses a gain estimator (e.g., a neural network or machine learning model configured to use speech frames or portions from the filtered audio signal segment, noise frames or portions from the noise spectrum, and the signal-to-noise ratio (SNR) from the acoustic neural embedding) to generate the gain level or gain factor for augmenting background noise properties of the input audio signal segment. In some implementations, the gain estimator condenses the speech frame and the noise frame to a single speech value and a noise value, respectively, using fully connected layers. With the single values, the gain estimator concatenates the SNR to the single speech value and the single noise value to generate a new vector. The resulting vector is passed through another fully connected layer to estimate 408 the noise gain level. Referring again to FIG. 6, data augmentation process 10 uses a gain estimator (e.g., gain estimator 316) with filtered audio signal segment 604, noise neural embedding 502, and noise spectrum 204 as inputs to estimate 408 a noise gain level (e.g., noise gain level 606).

In some implementations, processing the input audio signal segment with the noise spectrum and the noise neural embedding using the neural network includes generating 410 a noise signal segment by multiplying the noise spectrum by the noise gain level. For example, with the gain level estimated 408 from the filtered audio signal segment, the noise spectrum, and the acoustic neural embedding, data augmentation process 10 generates 410 a noise signal segment for applying to the filtered audio signal segment. In this manner, data augmentation process 10 modifies the filtered audio signal segment, which already includes the background reverberation properties of the target audio signal segment, to include the background noise properties of the target audio signal segment. Referring again to FIG. 6 and in some implementations, data augmentation process 10 multiplies the noise spectrum segment (e.g., noise spectrum 204) with gain level 606 (e.g., represented by action 320) to generate 410 a noise signal segment (e.g., noise signal segment 608).

In some implementations, processing the input audio signal segment with the noise spectrum and the noise neural embedding using the neural network includes generating 404 the augmented audio signal segment by applying 412 the noise signal segment to the filtered audio signal segment. For example, by combining the noise signal segment with the filtered audio signal segment, data augmentation process 10 generates an augmented audio signal segment that includes the background acoustic properties of the target audio signal segment. Referring again to FIG. 6, data augmentation process 10 adds noise signal segment 608 to filtered audio signal segment 604 (e.g., represented by action 324) to generate 404 augmented audio signal segment 218. In some implementations, augmented audio signal segment 218 is combined with other output audio signal segments to generate an output audio signal including the background acoustic properties of the target audio signal.

Figure 7:
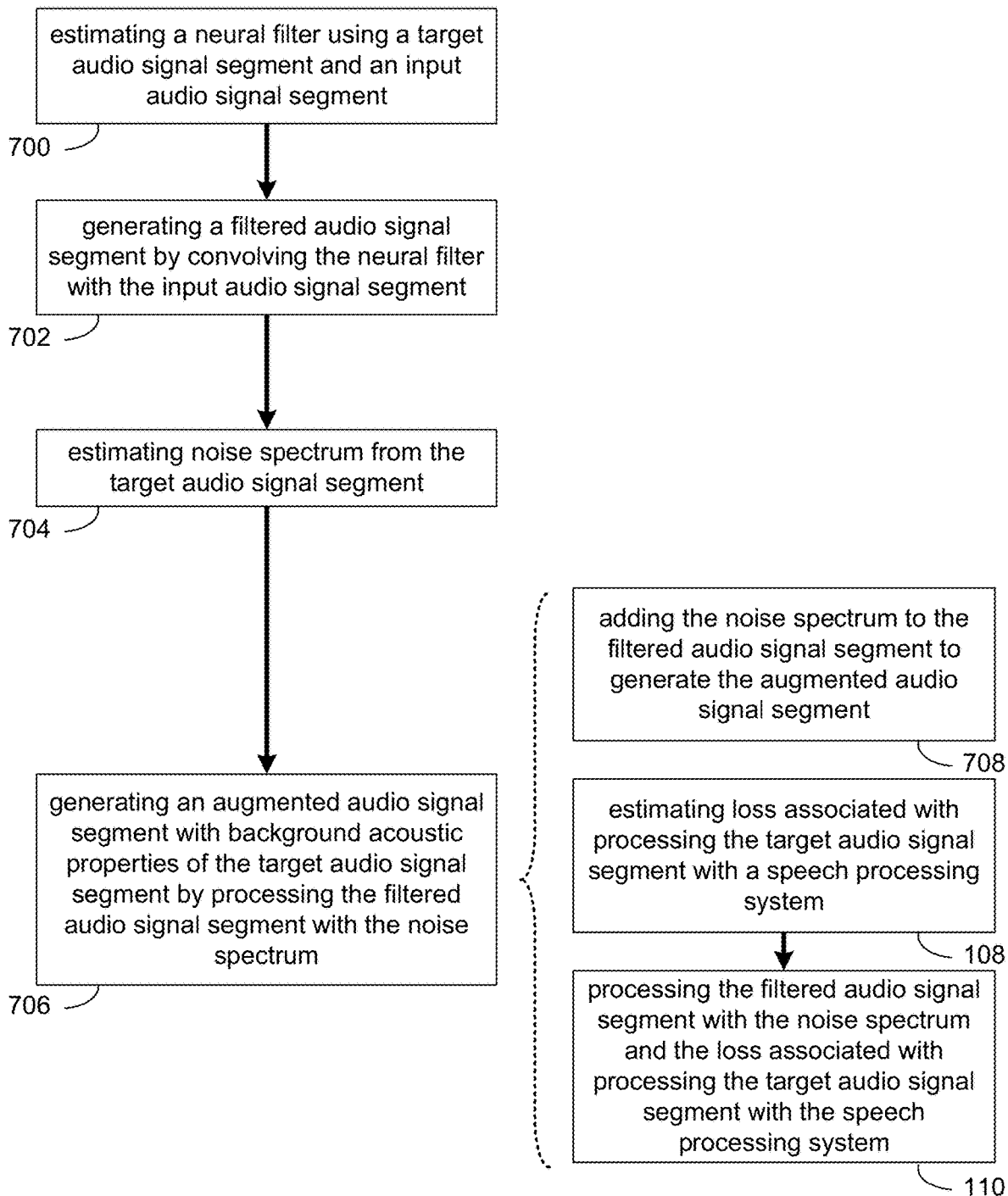
FIG. 7 is a flow chart of one implementation of the data augmentation process.
Figure 8:
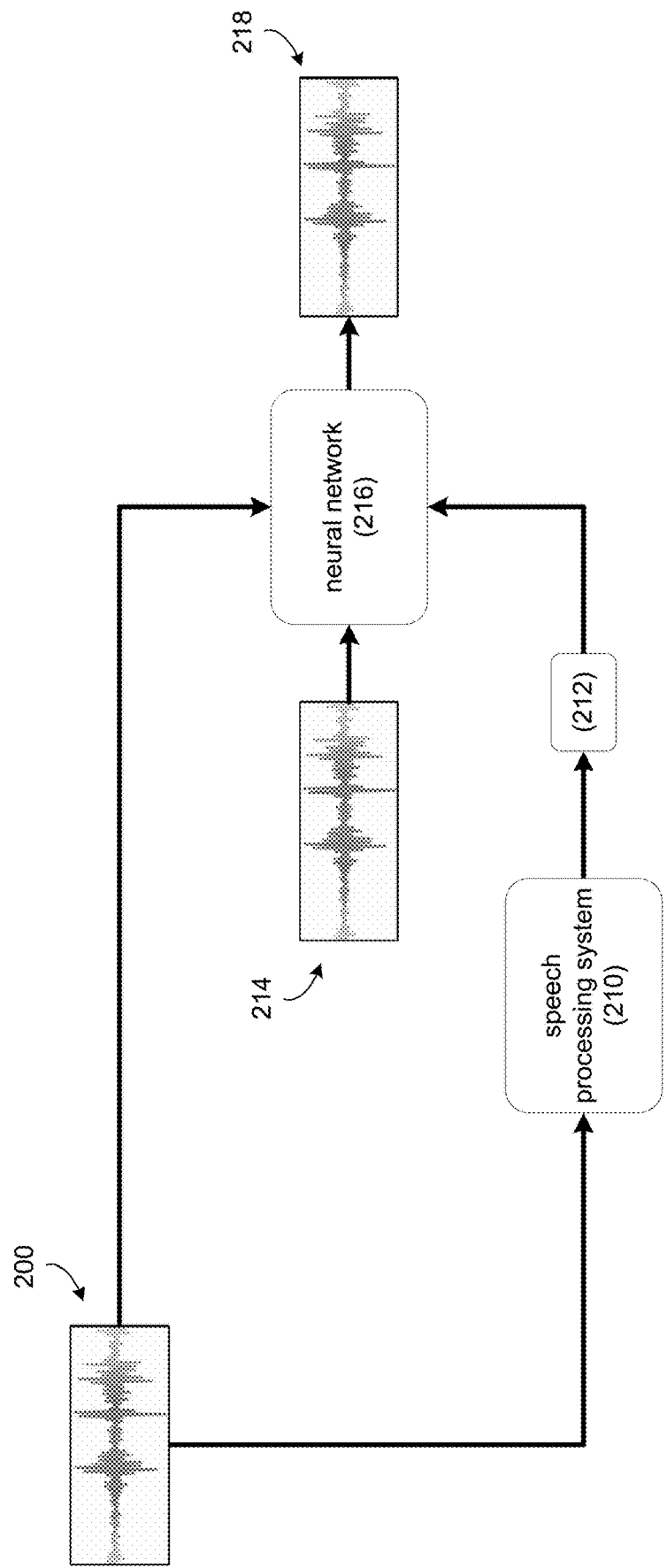
FIG. 8 is a diagrammatic view of one implementation of the data augmentation process.
Figure 9:
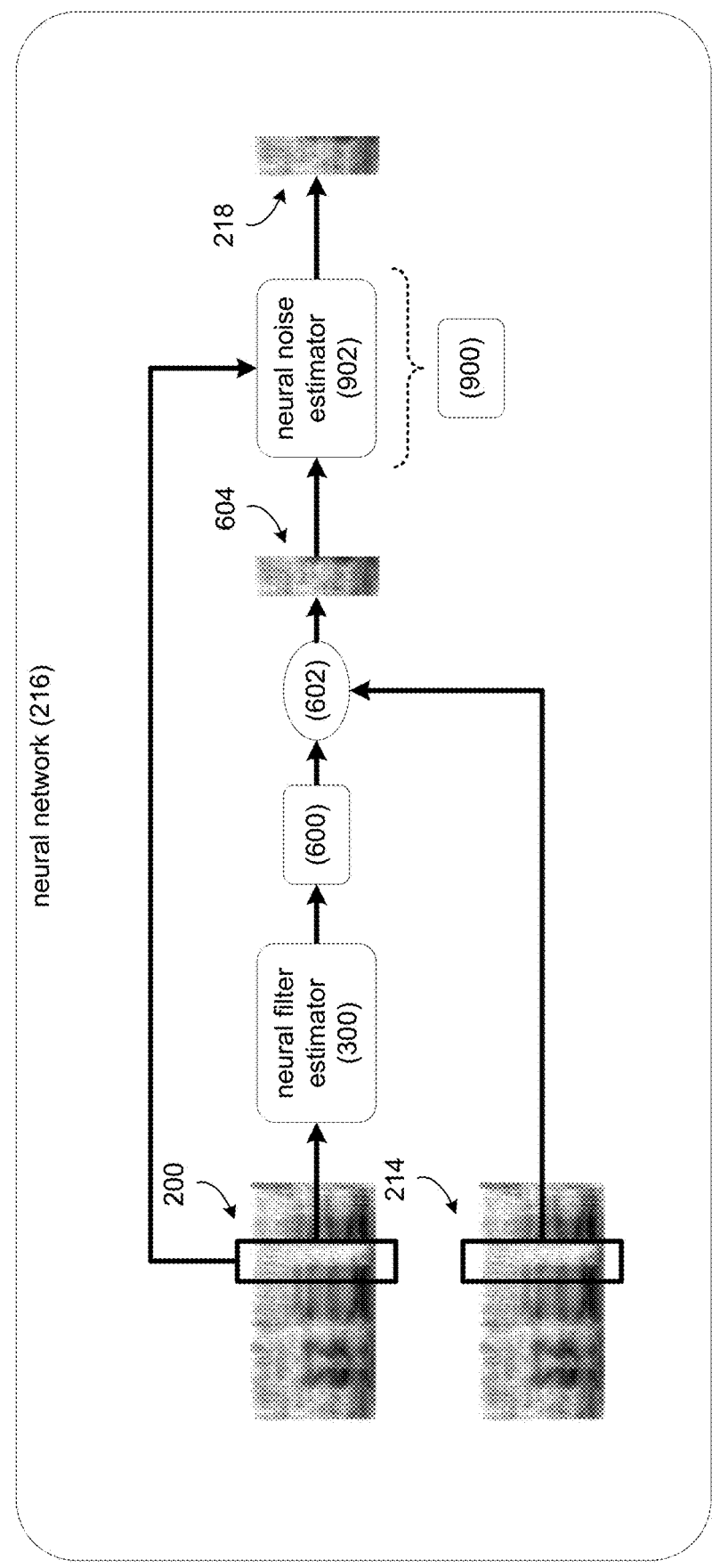
FIG. 9 is a diagrammatic view of a neural network in accordance with one implementation of the data augmentation process.

Referring also to FIGS. 7-9 and in some implementations, data augmentation process 10 generates an augmented audio signal segment with background acoustic properties without generating an acoustic neural embedding or a noise neural embedding. As will be discussed in greater detail below and in some implementations, data augmentation process 10 generates output audio signal segments using a neural network that derives reverberation and noise from a target audio signal. In some implementations, this configuration is useful when the input audio signal segment is derived from clean speech or TTS generated speech. In this example and as will be discussed in greater detail below; the input to neural network is the target audio signal (from which the room impulse response is estimated and applied) and the input audio signal (to which the estimated room impulse response is applied and noise added). Referring also to FIG. 8, data augmentation process 10 provides target audio signal segment 200 and input audio signal segment 214 to a neural network (e.g., neural network 216) for generating an augmented audio signal segment (e.g., augmented audio signal segment 218). In one example, neural network 216 is a two-channel neutral network that replicates background acoustics from a target signal to an input speech signal, without any acoustic embeddings.

In some implementations, data augmentation process 10 estimates 700 a neural filter using a target audio signal segment and an input audio signal segment. As discussed above, a neural filter is a filter that represents the impact of various signal properties on the signal segment. In this example, however, data augmentation process 10 estimates 700 a neural filter from the target audio signal segment as opposed to the input audio signal segment as shown in FIG. 3. Referring also to FIG. 9, data augmentation process 10 uses a neural filter estimator (e.g., neural filter estimator 300) to estimate 700 a neural filter (e.g., neural filter 600) representative of the reverberation of target audio signal segment 200).

In some implementations, data augmentation process 10 generates 702 a filtered audio signal segment by convolving the neural filter with the input audio signal segment. Referring also to FIG. 9 and in some implementations, data augmentation process 10 convolves (e.g., represented by action 602) neural filter 600 with input audio signal segment 214 to generate 702 a filtered audio signal segment (e.g., filtered audio signal segment 604). In some implementations, filtered audio signal segment 604 is a filtered speech signal that includes reverberation but not noise components or properties of target audio signal segment 200. As will be discussed in greater detail below and in some implementations, data augmentation process 10 uses the noise spectrum to generate noise-based background acoustic properties for target audio signal segment 200.

In some implementations, data augmentation process 10 estimates 704 a noise spectrum from the target audio signal segment. As discussed above, estimating 704 the noise spectrum includes modeling the noise spectrum from the target audio signal segment. For example, a noise spectrum is a representation of the noise within an audio signal segment as a function of time and/or frequency. In some implementations, data augmentation process 10 estimates 704 the noise spectrum from the target audio signal segment by using a combination of noise estimation algorithms or systems. In one example, estimating 704 the noise spectrum includes averaging past spectral power values, using a time-varying frequency-dependent smoothing parameter that is adjusted by the signal presence probability, where the speech presence probability is controlled by the minima values of a smoothed periodogram. In another example, data augmentation process 10 estimates 704 the noise spectrum using spectral modeling synthesis. In this sound modeling technique, sinusoidal peaks are measured and removed from each frame of a short-time Fourier transform (sequence of FFTs over time). The remaining signal energy is defined as noise. In contrast to the example of FIGS. 5-6 where a noise neural embedding is provided to neural network 216, data augmentation process 10 estimates 704 the noise spectrum (e.g., noise spectrum 900 as shown in FIG. 9) from target audio signal segment 214 using a neural noise estimator (e.g., neural noise estimator 902 as shown in FIG. 9). In some implementations, a neural noise estimator is a software and/or hardware module including noise estimation algorithms to estimate noise from an input audio signal segment. In one example, the neural noise estimator is a neural network configured to process the input audio signal segment to identify or extract a noise component from the input audio signal segment.

In some implementations, data augmentation process 10 generates 706 an augmented audio signal segment with background acoustic properties of the target audio signal segment by processing the filtered audio signal segment with the noise spectrum. For example, with noise spectrum 900 and filtered audio signal segment 604, data augmentation process 10 can generate 706 an augmented audio signal segment (e.g., augmented audio signal segment 218) with the background acoustic properties (e.g., reverberation from neural filter 600 and noise from noise spectrum 900) from target audio signal segment 214. As discussed above, with augmented audio signal segment 218 including the background acoustic properties of a target audio signal, data augmentation process 10 can generate augmented data to represent particular acoustic environments and/or to enhance training data diversity. In this manner, data augmentation process 10 converts clean speech signals (i.e., signal without reverberation or noise) into speech signals of a particular acoustic environment.

In some implementations, generating 706 the augmented audio signal segment with background acoustic properties of the target audio signal segment includes applying 708 the noise spectrum to the filtered audio signal segment to generate the output audio signal segment. For example, by combining the noise spectrum with the filtered audio signal segment, data augmentation process 10 generates an augmented audio signal segment that includes the background acoustic properties of the target audio signal segment. Referring again to FIG. 9, data augmentation process 10 adds noise spectrum 900 to filtered audio signal segment 604 to generate 706 augmented audio signal segment 218. In some implementations, augmented audio signal segment 218 is combined with other output audio signal segments to generate an output audio signal including the background acoustic properties of the target audio signal.

Figure 10:
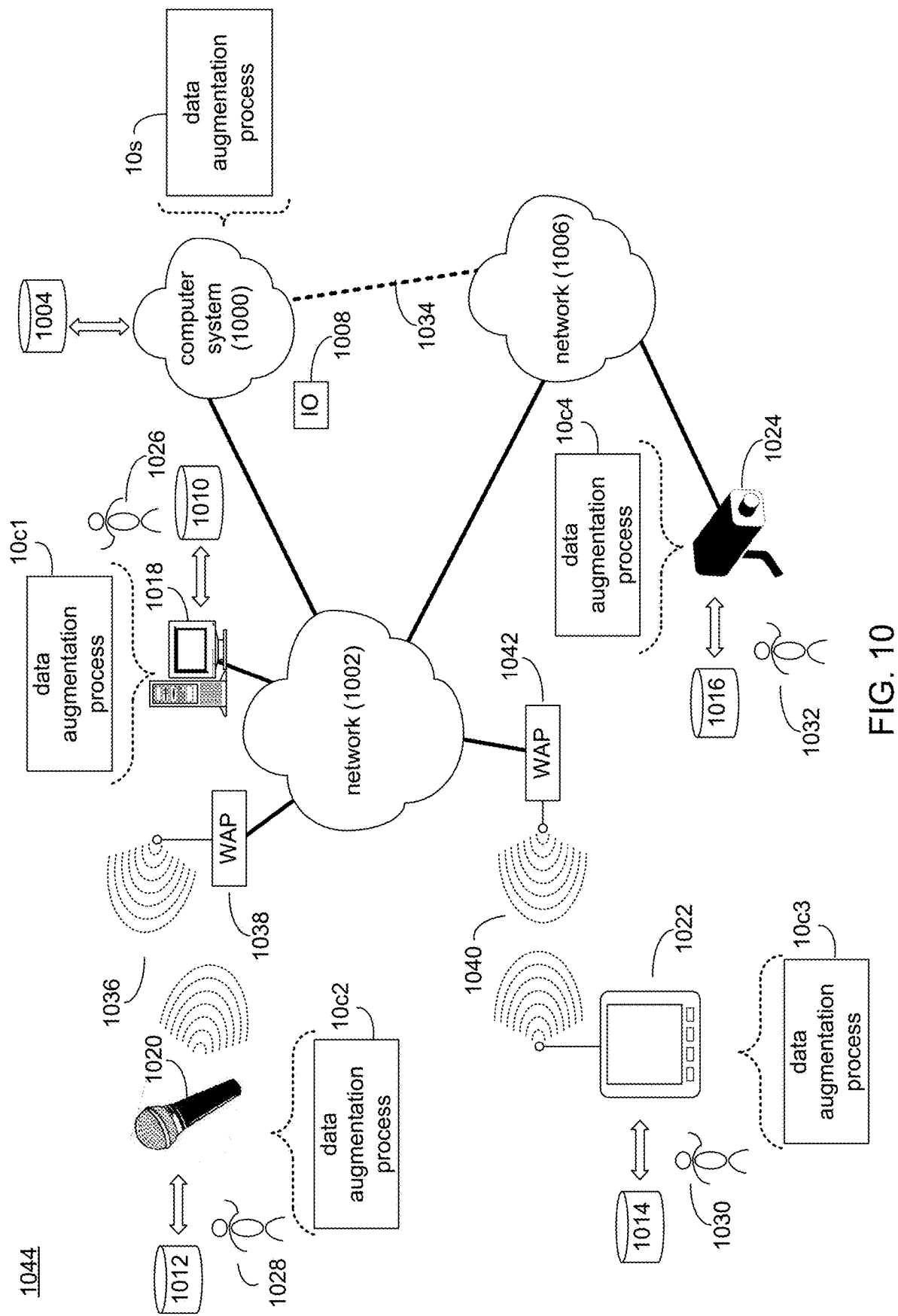
FIG. 10 is a diagrammatic view of a computer system and the data augmentation process coupled to a distributed computing network.

System Overview:

Referring to FIG. 10, there is shown data augmentation process 10. Data augmentation process 10 may be implemented as a server-side process, a client-side process, or a hybrid server-side/client-side process. For example, data augmentation process 10 may be implemented as a purely server-side process via data augmentation process 10s. Alternatively, data augmentation process 10 may be implemented as a purely client-side process via one or more of data augmentation process 10cl, data augmentation process 10c2, data augmentation process 10c3, and data augmentation process 10c4. Alternatively still, data augmentation process 10 may be implemented as a hybrid server-side/client-side process via data augmentation process 10s in combination with one or more of data augmentation process 10cl, data augmentation process 10c2, data augmentation process 10c3, and data augmentation process 10c4.

Accordingly, data augmentation process 10 as used in this disclosure may include any combination of data augmentation process 10s, data augmentation process 10cl, data augmentation process 10c2, data augmentation process 10c3, and data augmentation process 10c4.

Data augmentation process 10s may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (Saas) systems, a cloud-based computational system, and a cloud-based storage platform.

A SAN includes one or more of a personal computer, a server computer, a series of server computers, a mini computer, a mainframe computer, a RAID device and a NAS system. The various components of computer system 1000 may execute one or more operating systems.

The instruction sets and subroutines of data augmentation process 10s, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random access memory (RAM); a read-only memory (ROM); and all forms of flash memory storage devices.

Network 1002 may be connected to one or more secondary networks (e.g., network 1004), examples of which may include but are not limited to: a local area network: a wide area network: or an intranet, for example.

Various IO requests (e.g., IO request 1008) may be sent from data augmentation process 10s, data augmentation process 10cl, data augmentation process 10c2, data augmentation process 10c3 and/or data augmentation process 10c4 to computer system 1000. Examples of IO request 1008 may include but are not limited to data write requests (i.e., a request that content be written to computer system 1000) and data read requests (i.e., a request that content be read from computer system 1000).

The instruction sets and subroutines of data augmentation process 10cl, data augmentation process 10c2, data augmentation process 10c3 and/or data augmentation process 10c4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives: optical drives: RAID devices: random access memories (RAM): read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), machine vision input device 1024 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system: not shown), various medical devices (e.g., medical imaging equipment, heart monitoring machines, body weight scales, body temperature thermometers, and blood pressure machines: not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11g, 802.11n, Wi-Fi, and/or Bluetooth™ device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a target audio signal segment recorded in a target acoustic environment, wherein a speech processing system is deployed in the target acoustic environment;
   receiving an input audio signal segment generated by a text-to-speech (TTS) system, wherein background acoustic properties of the input audio signal segment mismatch background acoustic properties of the target audio signal segment;
   estimating noise spectrum from the target audio signal segment;
   generating an acoustic neural embedding from the target audio signal segment;
   estimating loss associated with processing the target audio signal segment with the speech processing system;
   generating an augmented audio signal segment with background acoustic properties matching the background acoustic properties of the target audio signal segment by processing the input audio signal segment to add noise and reverberation in accordance with the noise spectrum, the acoustic neural embedding, and the estimated loss associated with processing the target audio signal segment with the speech processing system, wherein a loss associated with processing the augmented audio signal segment with the speech processing system is within a threshold difference of the estimated loss associated with processing the target audio signal segment with the speech processing system; and
   training the speech processing system based on training data that includes the augmented audio signal segment.

2. The computer-implemented method of claim 1, wherein generating the acoustic neural embedding includes extracting the acoustic neural embedding from the target audio signal segment using a Non-Intrusive Speech Assessment (NISA) system.

3. The computer-implemented method of claim 1, wherein processing the input audio signal segment to add noise and reverberation includes:
   estimating a neural filter from the input audio signal segment, wherein the neural filter is used to generate the augmented audio signal segment.

4. The computer-implemented method of claim 1, wherein processing the input audio signal segment to add noise and reverberation includes:
   estimating a filter mask for the acoustic neural embedding, wherein the filter mask is used to generate the augmented audio signal segment.

5. The computer-implemented method of claim 1, wherein processing the input audio signal segment to add noise and reverberation includes:
   estimating a neural filter from the input audio signal segment;
   estimating a filter mask for the acoustic neural embedding; and
   generating a multiplied filter in a frequency domain by multiplying the neural filter from the input audio signal segment and the filter mask for the acoustic neural embedding, wherein the multiplied filter is used to generate the augmented audio signal segment.

6. The computer-implemented method of claim 1, wherein generating the augmented audio signal segment further includes performing de-noising and de-reverberation on the input audio signal.

7. The computer-implemented method of claim 1, wherein processing the input audio signal segment to add noise and reverberation includes:
   estimating a neural filter from the input audio signal segment;
   estimating a filter mask for the acoustic neural embedding;
   generating a multiplied filter in a frequency domain by multiplying the neural filter from the input audio signal segment and the filter mask for the acoustic neural embedding;
   generating a filtered audio signal segment by convolving the multiplied filter with the input audio signal segment a time domain or the frequency domain;
   estimating a noise gain level using the filtered audio signal segment, the acoustic neural embedding, and the noise spectrum;
   generating a noise signal segment by multiplying the noise spectrum by the noise gain level; and
   generating the augmented audio signal segment by applying the noise signal segment to the filtered audio signal segment.

8. A computing system comprising:
   at least one processor; and
   memory storing programming instructions for execution by the at least one processor, wherein the programming instructions, upon execution by the at least on processor, causes the computing system to perform the following operations:
   receiving a target audio signal segment recorded in a target acoustic environment, wherein a speech processing system is deployed in the target acoustic environment;
   receiving an input audio signal segment generated by a text-to-speech (TTS) system, wherein background acoustic properties of the input audio signal segment mismatch background acoustic properties of the target audio signal segment;

estimating a noise spectrum from the target audio signal segment;
generating an acoustic neural embedding from the target audio signal segment;
estimating loss associated with processing the target audio signal segment with the speech processing system;
generating an augmented audio signal segment with background acoustic properties matching the background acoustic properties of the target audio signal segment by processing the input audio signal segment to add noise and reverberation in accordance with the noise spectrum, the noise neural embedding, and the estimated loss associated with processing the target audio signal segment with the speech processing system, wherein a loss associated with processing the augmented audio signal segment with the speech processing system is within a threshold difference of the estimated loss associated with processing the target audio signal segment with the speech processing system; and
training the speech processing system based on training data that includes the augmented audio signal segment.

9. The computing system of claim 8, wherein generating the noise neural embedding includes extracting the noise neural embedding from the target audio signal segment using a Non-Intrusive Speech Assessment (NISA) system.

10. The computing system of claim 8, wherein processing the input audio signal segment to add noise and reverberation includes:
estimating a neural filter from the input audio signal segment, wherein the neural filter is used to generate the augmented audio signal segment.

11. The computing system of claim 8, wherein generating the augmented audio signal segment further includes performing de-noising and de-reverberation on the input audio signal.

12. The computing system of claim 8, wherein processing the input audio signal segment to add noise and reverberation includes:
estimating a neural filter from the input audio signal segment;
estimating a filter mask for the acoustic neural embedding; and
generating a multiplied filter in a frequency domain by multiplying the neural filter from the input audio signal segment and the filter mask for the acoustic neural embedding, wherein the multiplied filter is used to generate the augmented audio signal segment.

13. The computing system of claim 8, wherein processing the input audio signal segment to add noise and reverberation includes:
estimating a neural filter from the input audio signal segment;
estimating a filter mask for the acoustic neural embedding;
generating a multiplied filter in a frequency domain by multiplying the neural filter from the input audio signal segment and the filter mask for the acoustic neural embedding;
generating a filtered audio signal segment by convolving the multiplied filter with the input audio signal segment a time domain or the frequency domain;
estimating a noise gain level using the filtered audio signal segment, the acoustic neural embedding, and the noise spectrum;
generating a noise signal segment by multiplying the noise spectrum by the noise gain level; and
generating the augmented audio signal segment by applying the noise signal segment to the filtered audio signal segment.

14. A computer program product residing on a non-transitory computer readable medium having programming instructions stored thereon which, when executed by at least one processor of a system, cause the system to perform the following operations:
receiving a target audio signal segment recorded in a target acoustic environment, wherein a speech processing system is deployed in the target acoustic environment;
receiving an input audio signal segment generated by a text-to-speech (TTS) system, wherein background acoustic properties of the input audio signal segment mismatch background acoustic properties of the target audio signal segment;
estimating noise spectrum from the target audio signal segment;
generating an acoustic neural embedding from the target audio signal segment;
estimating loss associated with processing the target audio signal segment with the speech processing system; and
generating an augmented audio signal segment with background acoustic properties matching the background acoustic properties of the target audio signal segment by processing the input audio signal segment to add noise and reverberation in accordance with the noise spectrum, the acoustic neural embedding, and the estimated loss associated with processing the target audio signal segment with the speech processing system, wherein a loss associated with processing the augmented audio signal segment with the speech processing system is within a threshold difference of the estimated loss associated with processing the target audio signal segment with the speech processing system; and
training the speech processing system based on training data that includes the augmented audio signal segment.

15. The computer program product of claim 14, wherein generating the augmented audio signal segment further includes performing de-noising and de-reverberation on the input audio signal.

16. The computer program product of claim 14, wherein generating the acoustic neural embedding includes extracting the acoustic neural embedding from the target audio signal segment using a Non-Intrusive Speech Assessment (NISA) system.

17. The computer program product of claim 14, wherein processing the input audio signal segment to add noise and reverberation includes:
estimating a neural filter from the input audio signal segment, wherein the neural filter is used to generate the augmented audio signal segment.

18. The computer program product of claim 14, wherein processing the input audio signal segment to add noise and reverberation includes:
estimating a filter mask for the acoustic neural embedding, wherein the filter mask is used to generate the augmented audio signal segment.

19. The computer program product of claim 14, wherein processing the input audio signal segment to add noise and reverberation includes:
estimating a neural filter from the input audio signal segment;
estimating a filter mask for the acoustic neural embedding; and generating a multiplied filter in a frequency domain by multiplying the neural filter from the input audio signal segment and the filter mask for the acoustic neural embedding, wherein the multiplied filter is used to generate the augmented audio signal segment.

20. The computer program product of claim 14, wherein processing the input audio signal segment to add noise and reverberation includes:

estimating a neural filter from the input audio signal segment;

estimating a filter mask for the acoustic neural embedding;

generating a multiplied filter in a frequency domain by multiplying the neural filter from the input audio signal segment and the filter mask for the acoustic neural embedding;

generating a filtered audio signal segment by convolving the multiplied filter with the input audio signal segment a time domain or the frequency domain;

estimating a noise gain level using the filtered audio signal segment, the acoustic neural embedding, and the noise spectrum;

generating a noise signal segment by multiplying the noise spectrum by the noise gain level; and generating the augmented audio signal segment by applying the noise signal segment to the filtered audio signal segment.

* * * * *